United States Patent Office 2,746,936
Patented May 22, 1956

2,746,936

METHOD OF PREPARING CATALYSTS

Charles J. Plank, Woodbury, N. J., assignor to Socony Mobil Oil Company, Inc., a corporation of New York No Drawing. Application November 14, 1951,
Serial No. 256,389

4 Claims. (Cl. 252—465)

This invention relates to the preparation of impregnated porous materials and, more particularly, is concerned with the preparation of catalysts wherein a porous catalyst carrier is impregnated with a solution of a catalytically active material under particularly defined conditions of control.

Catalysts comprising one or more catalytic components supported on suitable carrier materials have heretofore been employed in a wide variety of industrial operations, such as in the manufacture of sulfuric acid and in reactions involving the conversion and/or treatment of hydrocarbons. Thus, such catalysts have found application in promoting hydrogenation, dehydrogenation, desulfurization, dehydrocyclization, isomerization, reforming, cracking, and the like.

Previous methods of preparing such supported catalysts have generally involved soaking the porous support with a solution of catalytic material until the support is substantially saturated with impregnating solution, after which the resulting product is dried or ignited to yield a porous mass having the catalytically active material distributed throughout the pores of the supporting material. A variation of this general procedure has included distribution through the pores of the carrier of a solution containing a mixture of a soluble compound of a metal and a reducing agent at such a temperature that the metallic compound is not appreciably reduced and then subjecting the porous carrier to such an elevated temperature that the metallic compound is reduced and the catalytic material deposited through all the pores of the carrier. Another modification of the above general method has involved introduction of a soluble substance capable of producing a catalytically active material into substantially all of the capillaries of a porous gel support followed by treatment with a soluble gas capable of reacting with the metallic compound and then effecting diffusion through the capillaries of a solvent in which precipitating action takes place. In all of the above described preparations, it was deemed advantageous to have the catalytically active material distributed uniformly throughout the porous support.

The present invention reverses this general practice. It is a major object of this invention to so control the process of impregnating a catalytically active material on a porous support that the active catalyst exists as a relatively restricted zone in a predetermined locality within said support. If so desired, a series of such impregnations may be used to produce a plurality of such zones of the same or different catalytically active materials. In the case where different catalytic materials are used, it is contemplated that each zone will perform a different catalytic function.

The above and other objects which will be apparent to those skilled in the art are achieved by the process of the present invention which, in its general aspects, comprises the treatment of porous solids which are to be impregnated with catalytic material by partially filling the pores thereof with an inert liquid to a predetermined extent and thereafter bringing the partially filled porous carrier into contact with an impregnating solution of a catalytically active ingredient. Upon such contact, the front of impregnating solution advances into the pores of the partially filled carrier, forcing inert liquid contained therein further into the interior of the carrier. Contact is maintained until the impregnating solution has penetrated into the pores of the partially filled carrier to a finite and predetermined depth, the ultimate degree of penetration being determined by the extent to which the porous carrier has previously been filled with inert liquid. The carrier is removed from contact with the impregnating solution before appreciable diffusion of said solution into the pores occupied by the inert liquid takes place. The resulting product is thereafter dried, driving off the inert liquid and the solvent of the impregnating solution, to yield a catalyst having a core composed of the porous carrier and a shell or outer layer overlying said core composed of the porous carrier impregnated to a finite and predetermined depth with a catalytically active ingredient.

While the process may be applied with any porous adsorptive solid, the support or carrier utilized will, in general, be a granular porous material which is capable of withstanding elevated temperatures, i. e., up to 700° C. or higher, and which is resistant to conditions which will prevail during revivification. For example, where the catalyst is one which is regenerated by burning a carbonaceous deposit therefrom in the presence of an oxygen-containing gas at an elevated temperature, the particular supporting material employed should be such as to withstand the conditions of regeneration. Representative of porous carrier materials which may be employed are bentonite, alumina, active carbon, montmorillonite, kaolin, bauxite, magnesia, zirconia, thoria, and the like. As a general rule, aluminum and/or siliceous adsorptive carrier materials of natural or synthetic origin will be employed. Particularly useful carrier materials are the inorganic oxide gels, and especially siliceous gels, such as silica gel and plural oxide gels containing a major proportion of silica. These supporting materials are, of course, not to be considered as being complete equivalents of each other. Under a given set of conditions, they may or may not possess a catalytic activity of their own. The carrier or support may be in the form of granules of any desired size and shape. A convenient carrier consists of spherical bead-like particles of inorganic oxide gel. Such particles may be prepared by any feasible procedure, for example, by the method described in U. S. 2,384,946.

In accordance with the instant invention, the pores of a suitable porous carrier are partially filled with an inert liquid, that is, a liquid which is chemically unreactive with the carrier under the conditions of contact so that the over-all effect of said liquid is predominately a physical occupation of pores filled therewith, serving to block off such pores during subsequent contact of the partially filled carrier with the impregnating solution. Partial filling of the pores with inert liquid may be accomplished in various ways, depending upon the nature of the carrier employed and on the type of liquid used. Thus, the carrier may be immersed in an inert liquid for a period of time sufficient to partially fill the pores thereof to the desired degree or the pores of the carrier may be evacuated and then partially filled with inert liquid to a predetermined extent or the carrier may be saturated with inert liquid and a portion thereof removed by evacuation. A freshly formed, inorganic oxide hydrogel which has been dried to a predetermined extent, generally to a point at which shrinkage thereof is substantially complete but before complete removal of water therefrom may constitute the partially filled porous carrier. With the use of dry, inorganic oxide gel particles as carriers, generally, direct contact with water or aqueous solutions is to be avoided since such contact will cause the gel granules to shatter into small fragments. Gel granules may, however, be partially filled with an aqueous inert liquid without disruption by first evacuating the gel and thereafter contacting the evacuated granules with water or aqueous solution while retaining the vacuum. Alternatively, instead of employing water as the inert liquid, other liquids with which the dry gel granules may be brought into direct contact without the necessity of evacuation and without encountering disruption may be employed. Suitable liquids for such purpose include those having a viscosity of at least about 20 centipoises at the temperature of treatment as described in U. S. Patent 2,456,578 and water-miscible organic liquids as described in U. S. Patent 2,456,577.

The particular nature of the inert liquid employed may vary widely. It is desirable that the liquid employed have a boiling point sufficiently low as to permit easy removal thereof from the impregnated carrier upon drying. The choice of inert liquid will, as indicated above, depend in part on the nature of the carrier. Typical of the liquids contemplated for such purpose are: water; aromatic hydrocarbons, such as benzene, toluene, xylene, etc.; halogenated organic compounds, such as carbon tetrachloride, chlorobenzene, etc.; alcohols, such as methanol, ethanol, amyl alcohol, glycol, glycerine, etc.; ketones, such as acetone and methylethyl ketone; aldehydes, such as acetaldehyde; ethers, such as ethyl ether; nitrated organic compounds, such as nitrobenzene; heterocyclic compounds, such as thiophene, furan, and derivatives thereof. The above list is, of course, not to be construed as limiting but merely representative, since many other liquids may likewise be employed for the purpose of partially filling the pores of the carrier in accordance with the instant process. It is a preferred embodiment of the invention, however, as will appear hereinafter, that the inert liquid partially filling the pores of the carrier be substantially immiscible with the impregnating solution with which the partially filled carrier is subsequently brought into contact. Thus, if water is the liquid used for partially filling the pores of the carrier, the impregnating solution is suitably, but not necessarily, water-immiscible; alternatively, if, for example, benzene or other water-immiscible liquid is employed for partially filling the pores of the carrier, then preferably an aqueous impregnating solution is used.

The extent to which the pores of the carrier are partially filled with inert liquid will depend primarily on the concentration of active catalytic ingredient desired in the final catalyst. In those instances where most of the pore volume is occupied by inert liquid prior to bringing the carrier into contact with the impregnating solution, the ultimate concentration of active catalytic material may be relatively small. On the other hand, where a substantial portion of the total pore volume is unoccupied by inert liquid upon contact with the impregnating solution, the concentration of active catalytic ingredient may be considerable. As will be apparent, the concentration of catalytic material upon the impregnated carrier may be varied within wide limits. The optimum concentrations of the essential constituents of the catalysts will generally depend upon the particular constituents, upon the use to which the catalyst is to be put and upon the particular conditions under which the catalyst is to be used. For most uses, the porous carrier will be in substantial excess over the active catalytic component. Thus, ordinarily, catalysts prepared by the present method will contain from about 0.1% to about 30% by weight of active metal and/or metal compound introduced by impregnation. It will be understood, however, that the invention is not restricted in regard to relative amounts of carrier and catalytically active material present in the resulting catalysts. Other factors being equal, the impregnated catalysts produced by the method described herein will generally contain a lesser amount of active ingredient than the impregnated catalysts prepared by the procedures heretofore employed since catalysts prepared by the instant process will have the active ingredient concentrated and localized in an outer layer surrounding a core of the carrier.

The supporting or carrier materials are, in accordance with the present process, impregnated with a solution of the active catalytic ingredient or a solution of a compound or material capable of being converted to an active catalytic ingredient. Ordinarily, but not necessarily, aqueous solutions will be used for impregnating. The final catalyst will contain the porous carrier impregnated with an active metal or metal compound to a predetermined depth. Among specific metals which may be incorporated as such or in the form of compounds in porous carriers are beryllium, iron, zinc, copper, manganese, chromium, aluminum, cadmium, antimony, cobalt, nickel, etc. It is to be understood that metal or metal compound catalysts suitable for one purpose are very often entirely unsuitable for some other purpose. Accordingly, the particular metals or metal compounds chosen in practicing the invention will depend upon the contemplated use of the resulting catalyst.

A number of the metal compounds which are desired as catalytically active constituents of catalysts, such as oxides, sulfides, and the like are not sufficiently water-soluble to permit direct impregnation of the carrier with aqueous solutions of them. In such cases, the carrier may be impregnated with a solution of desired metal compound in a solvent other than water or with an aqueous solution of a sufficiently soluble, selected metal salt which can be converted, after impregnation, to the desired metal oxide or metal sulfide, for example, by calcination or hydrogen sulfide treatment, respectively, of the impregnated carrier. In some instances, it may be desirable to follow the above-described period of controlled impregnation by a step wherein an insoluble compound of the desired catalytic material is produced. For example, if a porous carrier partially filled with inert liquid is brought into contact with an aluminum salt solution, the aluminum may be precipitated as the hydroxide after penetration thereof to the desired extent, using, for example, NH$_4$OH or NaOH. Once this has been done, essentially no further diffusion of the aluminum ions can occur and the width of the active catalytic zone will have been defined by the amount and extent of diffusion of the aluminum ions and hydroxyl ions during the impregnating period and the period necessary for neutralization of the aluminum salt. The precipitated hydroxide may, if desired, thereafter be converted to the oxide by calcination under suitable temperature conditions. A catalyst consisting of a carrier having a metal incorporated therein to a finite and predetermined depth may be prepared by controlled impregnation of the carrier with a metal hydroxide or metal oxide as described above and then subjected to treatment with a reducing gas under reducing conditions.

The above-described methods of preparing catalysts are, with suitable modifications, readily adaptable to the preparation of catalysts consisting of a carrier and a plurality of active metals and/or active metal compounds. Thus, a catalyst prepared by the above-described procedure consisting of a carrier impregnated to a finite and predetermined depth with a catalytic ingredient may, after drying, be again partially filled with an inert liquid and impregnated with a solution of a second catalytic material so that the resulting product is a catalyst having a core composed of the porous carrier and a shell overlying said core composed of the porous carrier impregnated to a finite and predetermined depth with an intimate mixture of active catalytic ingredients. To take a specific example, a carrier consisting of alumina gel may be impregnated with an aqueous chromium salt solution to a finite and predetermined extent as described above. The resulting product may thereafter be dried and calcined to yield alumina impregnated to a predetermined extent with chromia. This product may then be impregnated a second time employing the controlled penetration technique described above with a solution of a molybdenum salt. This product may thereafter be dried and calcined to yield the final catalyst consisting of a core of alumina surrounded by an outer layer or shell of alumina impregnated with chromia and molybdena. If desired, a catalyst having relatively distinct zones of different catalytically active materials may be produced by the process of the invention. In this case, a carrier is impregnated to a finite and predetermined extent with an impregnating solution of a catalytically active ingredient to yield a catalyst having a core of a carrier and a shell overying the core composed of the porous carrier impregnated with the catalytically active ingredient. The outer layer of the catalytically active ingredient is thereafter removed by dissolving with acid, ammonium salt, or other material capable of removing the catalytically active ingredient without detrimentally affecting the porous structure of the carrier. The outer layer of the catalyst consisting essentially of unimpregnated carrier may thereafter be impregnated with a solution of a second catalytically active ingredient to the extent of the layer of removed first catalytically active ingredient. The resulting product is thereafter dried and, if desired, calcined to yield a catalytic composite composed of a core of the porous carrier, a shell surrounding said core composed of the porous carrier impregnated with the first of said catalytically active ingredients and a second outer shell composed of the porous carrier impregnated to a controlled depth with the second catalytically active ingredient. Thus, for example, a catalyst may be produced having a core of silica, a shell surrounding said silica core of controlled width consisting of silica impregnated with chromia and a second outer shell consisting of silica impregnated with alumina. With the use of such catalyst, it is contemplated that each catalytic zone will perform a different catalytic function.

It is thus possible, in accordance with the process of this invention, to place the active catalytic zone overlying a core of the porous carrier at any desired region in the carrier particle. This zone may be more completely specified as follows. If the pore size distribution is uniform, the active zone will have both its inner and outer boundaries essentially parallel to the external surface of the carrier particles. For example, if the carrier is spherical in shape, both boundaries of the active zone will be spherical surfaces with centers at the center of the spherical carrier. The method of locating the active zone at a position other than with its external boundary coinciding with the external boundary of the carrier may be illustrated by impregnating a spherical, porous carrier of silica gel having a radius of R with an aqueous aluminum salt solution for a time sufficient to adsorb aluminum ions to a depth of $x$. The radius of the inner zone containing no aluminum is $R-x$. After removing the excess solution of the aluminum salt, the aluminum ions may be fixed in position by neutralizing the aluminum salt with a base. This step, while not essential, is usually desirable. Following this step, the particles may be contacted with a dilute acid to remove an outer zone of alumina to a depth of $y$, after which the excess acid could be neutralized to yield a catalyst particle having an inner zone, A, of inert alumina bounded by a sphere of radius $R-x$, an active zone, B, of silica plus alumina bounded by the spherical surfaces $R-x$ and $R-y$, and an outer zone, C, of inert alumina bounded by the spherical surfaces R and $R-y$.

After contacting the porous carrier with the impregnating solution or solutions described above, the resulting product is dried to remove substantially all of the inert liquid contained therein and the solvent of the impregnating solution or solutions employed. If desired, the dried catalyst may thereafter be calcined under suitable temperature conditions. As pointed out hereinabove, the inert liquid and the solvent of the impregnating solution may be one and the same, or the inert liquid and the solvent of the impregnating solution may be miscible or partially miscible. In such instances, the catalyst particles, after impregnation to the desired extent, are preferably subjected to a rapid drying in order to forestall diffusion of the impregnating solution into the pores of the carrier occupied by the inert liquid. In a preferred embodiment of the invention, the inert liquid employed for partially filling the pores of the carrier and the impregnating solution with which such partially filled carrier is subsequently brought into contact are substantially immiscible. With the use of such immiscible liquids, control of the time of impregnation and of the time consumed in subsequent drying is unnecessary since essentially no diffusion of the impregnating solution will take place into the pores of the carrier occupied by the inert liquid. Thus, it is particularly advantageous to use two immiscible liquids for the two steps of impregnation. In particular, the active catalytic ingredient is preferably insoluble in the inert liquid employed.

The following examples will serve to illustrate the method of this invention:

EXAMPLE 1

A 25-gram batch of silica-alumina bead catalyst containing approximately 91% silica and approximately 9% alumina was evacuated for about 30 minutes at a pressure of about 1 mm. of mercury. Since the pore volume of the gel was about 0.42 cc./g., 9 cc. of carbon tetrachloride were added to the evacuated catalyst to give about 85–90% filling of the pores. An aqueous 20% solution of $VOSO_4$ (containing some excess $H_2SO_4$) was added to complete the filling of the pores. The product was dried at 250° F. after certain periods of contact with the aqueous $VOSO_4$ solution. After drying to remove carbon tetrachloride and water, the individual beads were cross-sectioned and it was seen that the blue color of the vanadyl ion had penetrated only about 0.1 mm. or less into the bead, which had a diameter of about 3.0 mm. The depth of penetration was the same for particles exposed to the $VOSO_4$ solution 10 minutes or an hour. This was attributable to the immiscibility of $H_2O$ and $VOSO_4$ in $CCl_4$. Some of the beads were left in contact with the blue solution overnight. The depth of penetration in this case was substantially the same as that for the 10-minute contact time.

The above example is illustrative of a general method of controlling the depth of impregnation of a catalyst carrier wherein an inert liquid and an impregnating solution immiscible therewith are employed. In such case, it is unnecessary to control the time of contact of the partially filled carrier with the impregnating solution. However, if the inert liquid is miscible with the impregnating solution, diffusion of the latter into the inner zone of the carrier is possible and contact time in such instances is necessarily controlled as illustrated in the following example:

EXAMPLE 2

One hundred fifty cc. of alumina gel pellets were saturated with water. About one-quarter of the water was thereafter removed by evacuation. The pellets were then covered with a 60% aqueous solution of Cr(NO$_3$)$_3$·9H$_2$O for two minutes. The pellets were then removed from contact with the impregnating solution and quickly dried by placing in a furnace at 500° F. for 10 minutes. The resulting catalyst was calcined at 1000° F. for about 16 hours.

A second catalyst was prepared wherein chromia was dispersed throughout the alumina gel pellets rather than in an outer shell, as in the above-described catalyst. This catalyst contained approximately the same proportion of chromia and alumina as in the above-prepared catalyst.

In two parallel reforming runs, a charge of depentanized light Oklahoma City naphtha was run at about 1 space velocity and at 1065° F. for 1 hour over each of the above catalysts. At the end of the runs, the catalysts were removed before regeneration and individual pellets from each batch were cut to show cross-sections of the pellets. The appearance of the cross-sections clearly showed the advantage of the first prepared catalyst. The second catalyst, wherein the alumina pellets were completely penetrated by the chromia, had a heavy black coke deposit throughout the pellets. The first prepared catalyst had only a light gray deposit in the center of the pellets and a heavy black deposit in the outer shell. These two zones corresponded exactly with the zones defined by the depth of Cr$_2$O$_3$ penetration of catalyst. This experiment thus provided visible evidence of a decreasing coke production accruing to catalyst for reforming in which the active oxide is present only as an outer shell on an inert carrier.

Cracking catalysts prepared by the method of this invention having active catalytic material concentrated and localized in outer shell around an inert core of catalyst carrier also exhibit an increased gasoline-to-coke ratio over conventional cracking catalysts when employed in the cracking of heavy petroleum oils to lighter products boiling in the range of gasoline. In addition, the catalysts having the active catalytic ingredient concentrated in an outer shell surrounding a core of carrier are much easier to regenerate than conventional cracking catalysts wherein the active catalytic ingredient is distributed thoughout the pores of the carrier or supporting material. The improvements employing catalysts having the active material in an outer shell surrounding an inert core may be illustrated by the following examples:

EXAMPLE 3

A silica hydrogel was prepared at a pH of 7.1 by mixing a solution of 625 cc. of sodium silicate containing 0.200 g. SiO$_2$/cc. (ratio SiO$_2$/Na$_2$O=3.2) and 625 cc. H$_2$O with a solution of 315 cc. HCl (3.73 N) and 935 cc. H$_2$O. The time of gelation was 55 seconds at a temperature of 4° C. The hydrogel was immediately washed upon formation with a 1% by weight aqueous solution of HCl. This washing was carried out three times for 2-hour periods and once for 16 hours and was thereafter water-washed until free of chloride ion. The hydrogel was then covered with a 15% by weight aqueous solution of Al(NO$_3$)$_3$·9H$_2$O for one hour. The liquid was decanted and the hydrogel was oven-dried at a temperature of about 280° F. for about 16 hours and finally calcined at 1000° F. The resultant product was tested for the catalytic cracking of Light East Texas Gas Oil in the standard Cat-A test with the results shown in Table I below. As will be realized, the significant results are those for the steam treated catalyst since steam treatment results in a stabilized catalyst whose activity is much closer to the equilibrium activity than is that of the fresh catalyst. It is, therefore, the gasoline-to-coke ratio of the stabilized catalyst which has undergone steam treatment that is indicative of the gasoline-to-coke ratio to be expected in commercial operation.

With the catalyst of this example, the gasoline-to-coke ratio at a 38.6% gasoline yield was 21.4 as compared to a gasoline-to-coke ratio of 14.9 at 37.3% gasoline yield for a silica-alumina co-gelled catalyst in which alumina was distributed throughout the silica.

EXAMPLE 4

A 3½-liter portion of silica hydrogel beads, prepared at a pH of 7, was aged for 3 hours at 55° F. and then treated with dilute H$_2$SO$_4$. The beads were then washed free of sulfate ion with water. The hydrogel beads so treated were then covered with a 15% aqueous solution of Al(NO$_3$)$_3$·9H$_2$O for 30 minutes. The impregnating solution was decanted at the end of this time. The resulting impregnated gel was oven-dried at a temperature of about 280° F. for 16 hours and finally calcined at 1000° F. The Cat-A test results obtained on this catalyst after steam treatment for 10 hours at 1200° F. in 100% steam atmosphere are shown in Table I below. As will be noted, the coke make is 19% lower for this catalyst than for a conventional co-gelled silica-alumina catalyst of the same density and capable of yielding the same gasoline production.

Example 5

A 3½-liter portion of silica hydrogel beads, prepared at a pH of 7, was aged 15 hours at 42–50° F. and then treated with dilute H$_2$SO$_4$. The beads were then water-washed free of sulfate ion. The hydrogel beads so treated were covered with a 10% aqueous solution of Al(NO$_3$)$_3$·9H$_2$O for 45 minutes. The impregnating solution was then decanted. The resulting impregnated gel was oven-dried at a temperature of about 280° F. for about 16 hours and then calcined at 1000° F. The Cat-A results obtained on this catalyst, after it was steam treated for 10 hours at 1200° F. in 100% steam, are shown in Table I. As will be noted, the coke make for this catalyst is 24% lower than for a co-gelled silica-alumina catalyst of the same density and capable of yielding the same gasoline production.

Example 6

Approximately 450 cc. of calcined silica gel beads were evacuated and then exposed to water vapor for 96 hours to effect saturation with water without encountering breakage of the gel. The beads were then covered with an 80% by weight aqueous solution of Al(NO$_3$)$_3$·9H$_2$O for one hour. After decanting the impregnating solution, the beads were oven-dried at a temperature of about 280° F. for about 16 hours and then calcined at 1000° F. The Cat-A test results obtained on this catalyst after steam treatment at 1200° F. for 10 hours in 100% steam are shown in Table I. As indicated there, the coke make is 23% lower for this catalyst than for a co-gelled silica-alumina catalyst of the same density and capable of giving the same gasoline production. The calcined silica gel beads used as a carrier in this example were prepared in a manner similar to the hydrogen beads employed in Example 5 with the exception that they were aged 48 hours at 48–50° F. before acid treating. Also, the hydrogel beads in this case were oven-dried and calcined at 100° F. prior to impregnation.

Example 7

A 4-liter batch of desiccant type silica-alumina beads containing 99% SiO$_2$ and 1% Al$_2$O$_3$ by weight, prepared at a pH of 7, was aged for approximately 2 weeks at room temperature to reduce the final density of the beads to a desired level. The beads were then leached with a 10% by weight aqueous solution of HCl to remove the alumina. The hydrogel beads were then water-washed free of chloride ion, dried for 72 hours at 150° F., and then calcined at 1000° F. The resulting calcined beads were exposed to a stream of air saturated with moisture at room temperature until complete saturation of the beads occurred. The resulting water-saturated beads were then covered with a 60% by weight aqueous solution of $Al(NO_3)_3 \cdot 9H_2O$ for 20 minutes. The impregnating solution was decanted at the end of this time and the resulting product was oven-dried at a temperature of about 280° F. for about 16 hours and calcined at 1000° F. The Cat-A results obtained on this catalyst, after it was steam treated 10 hours at 1200° F. in 100% steam, are set forth in Table I. As shown there, the coke make is 31% lower for this catalyst than for a conventional co-gelled silica-alumina catalyst of the same density and capable of yielding the same gasoline production. The Cat-A test results referred to in Examples 3 to 7 are tabulated below:

Table I.—Cat-A test results on cracking catalysts [1]

| Example | Bulk Density (g./cc.) | Gas Gravity | Gas, Wt. Percent | Coke, Wt. Percent [2] | Gasoline, Vol. Percent | Coke Reduction, Percent [3] |
|---|---|---|---|---|---|---|
| 3 | 0.70 | 1.53 | 5.2 | 1.8 (2.5) | 38.6 | 28 |
| 4 | 0.85 | 1.54 | 4.4 | 1.7 (2.1) | 34.8 | 19 |
| 5 | 0.88 | 1.53 | 3.0 | 1.6 (2.1) | 34.2 | 24 |
| 6 | 0.85 | 1.66 | 4.8 | 2.0 (2.6) | 37.9 | 23 |
| 7 | 0.67 | 1.51 | 1.9 | 1.1 (1.6) | 31.4 | 31 |

[1] Tested after steam treating 10 hours at 1200° F. with 100% steam.
[2] Values in parentheses are coke production for a conventional silica-alumina co-gelled catalyst of the same density and with the same cracking activity.
[3] Reduction based on the figure in parentheses in column 5 (cf. note 2).

From the foregoing results, it is believed evident that catalysts having the active catalytic ingredient concentrated in an outer shell surrounding a core of the catalyst carrier afford a distinct improvement in reducing coke formation when such catalysts are employed in the cracking of heavier petroleum oils to lighter materials boiling in the range of gasoline. While the present invention is, of course, not to be limited by any theory, it is believed that in most catalytic processes employing porous solid catalysts which have very small pores, only an outer shell of the catalyst is useful in prompting catalysis of the desired reaction. This is believed due to the fact that the rate of diffusion of the reactant molecules through the submicroscopic pores of the catalyst is relatively slow. As a result, those molecules which do penetrate to the center of the catalyst have such a long time of contact with the catalyst that excessive reaction occurs, giving gas and coke rather than the desired products. In cracking, for example, the original products in the gasoline boiling range can diffuse much more readily into the center of the porous catalyst than can the gas oil molecules so that secondary undesirable reactions tend to occur in that zone. Furthermore, any reaction which such products undergo further decreases the gasoline yield while increasing the gas and coke make.

The present invention thus affords an improved method for preparing impregnated catalysts having a core composed of the porous carrier, which is normally catalytically inert, so that it does not promote undesirable secondary reactions, and a shell overlying the said core composed of the carrier impregnated to a finite and predetermined depth with a catalytically active ingredient. By partially filling the pores of the carrier with an inert liquid prior to bringing the carrier into contact with an impregnating solution, it has been found that the pores occupied by inert liquid are blocked off from subsequent contact with the impregnating solution and that consequently the catalytically active ingredient deposited by impregnation is concentrated and localized in an outer shell surrounding a core of carrier.

I claim:
1. In the process of preparing a catalyst consisting essentially of chromia deposited on granular porous alumina, the improvement which comprises partially filling the pores of granules of alumina with a substantially completely volatizable liquid chemically unreactive therewith, contacting said partially filled granules of alumina with a solution of a chromium compound decomposable to chromia, maintaining said partially filled granules of alumina in contact with said solution for a period of time sufficient to permit said solution to penetrate into the pores of the alumina to a depth sufficient to place a catalytic amount of chromia within said pores, removing the granules of alumina so treated from contact with said solution before appreciable diffusion thereof into the pores occupied by said liquid ensues, thereafter drying the resulting product to remove substantially all of said volatizable liquid and the solvent of said solution to yield a granular catalyst having a core composed of alumina and a shell overlying said core composed of alumina impregnated with a catalytic amount of chromia.

2. In the process of preparing a catalyst consisting essentially of chromia deposited on granular porous alumina gel, the improvement which comprises partially filling the pores of granules of alumina gel with a substantially completely volatizable liquid chemically unreactive therewith, contacting said partially filled granules of alumina gel with a solution of a chromium salt decomposable to chromia, maintaining said partially filled granules of alumina gel in contact with said solution for a period of time sufficient to permit said solution to penetrate into the pores of the alumina gel to a depth sufficient to place a catalytic amount of chromia within said pores, removing the granules of alumina gel so treated from contact with said solution before appreciable diffusion thereof into the pores occupied by said liquid ensues, thereafter drying the resulting product to remove substantially all of said volatizable liquid and the solvent of said impregnating solution to yield a granular catalyst having a core composed of alumina gel and a shell overlying said core composed of alumina gel impregnated with a catalytic amount of chromia.

3. In the process of preparing a catalyst consisting essentially of chromia deposited on granular porous alumina, the improvement which comprises saturating granules of alumina with a substantially completely volatizable liquid chemically unreactive therewith, subjecting said saturated granules of alumina to evacuation, thereby partially removing the liquid contained in the pores of said alumina, contacting the resulting partially filled granules of alumina with a solution of a chromium compound decomposable to chromia, maintaining said partially filled granules of alumina in contact with said solution for a period of time sufficient to permit said solution to penetrate into the pores of the alumina to a depth sufficient to place a catalytic amount of chromia within said pores, removing the granules of alumina so treated from contact with said solution before appreciable diffusion thereof into the pores occupied by said liquid ensues, thereafter drying the resulting product to remove substantially all of said volatizable liquid and the solvent of said solution to yield a granular catalyst having a core composed of alumina and a shell overlying said core composed of alumina impregnated with a catalytic amount of chromia.

4. In the process of preparing a catalyst consisting essentially of chromia deposited on granular porous alumina, the improvement which comprises partially filling the pores of granules of alumina with water, contacting said partially filled granules of alumina with an aqueous solution of a chromium compound decomposable to chromia, maintaining said partially filled granules of alumina in contact with said aqueous solution for a period of time sufficient to permit said solution to penetrate into the pores of the alumina to a depth sufficient to place a catalytic amount of chromia within said pores, removing the granules of alumina so treated from contact with said aqueous solution before appreciable diffusion thereof into the pores occupied by said water ensues and rapidly drying the product substantially free of water to yield a granular catalyst having a core composed of alumina and a shell overlying said core composed of alumina impregnated with a catalytic amount of chromia.

References Cited in the file of this patent

UNITED STATES PATENTS

| | | |
|---|---|---|
| 1,939,647 | Arnold et al. | Dec. 19, 1933 |
| 2,211,208 | Ipatieff et al. | Aug. 13, 1940 |
| 2,384,946 | Marisic | Sept. 18, 1945 |
| 2,411,829 | Huffman | Nov. 26, 1946 |
| 2,424,637 | Smith et al. | July 29, 1947 |
| 2,606,159 | Owen | Aug. 5, 1952 |
| 2,643,980 | Houdry | June 30, 1953 |